(12) United States Patent
Cartledge

(10) Patent No.: US 10,047,728 B2
(45) Date of Patent: Aug. 14, 2018

(54) RENEWABLE ENERGY SYSTEM AND METHODS FOR CREATING RENEWABLE ENERGY

(71) Applicant: Richard Cartledge, Boca Raton, FL (US)

(72) Inventor: Richard Cartledge, Boca Raton, FL (US)

( * ) Notice: Subject to any disclaimer, the term of this patent is extended or adjusted under 35 U.S.C. 154(b) by 158 days.

(21) Appl. No.: 15/144,273

(22) Filed: May 2, 2016

(65) Prior Publication Data

US 2016/0319803 A1 Nov. 3, 2016

Related U.S. Application Data

(60) Provisional application No. 62/155,199, filed on Apr. 30, 2015.

(51) Int. Cl.
*F03G 6/00* (2006.01)

(52) U.S. Cl.
CPC ............... *F03G 6/00* (2013.01); *Y02E 10/46* (2013.01)

(58) Field of Classification Search
CPC ..... F03G 3/00; F03G 3/02; F03G 6/00; F03G 7/04; F03G 7/10; Y02E 10/46
See application file for complete search history.

(56) References Cited

U.S. PATENT DOCUMENTS

| | | | | |
|---|---|---|---|---|
| 3,659,416 A | * | 5/1972 | Brown | F03G 3/00 60/530 |
| 4,570,444 A | * | 2/1986 | Gould | F03G 3/00 60/531 |
| 6,892,539 B2 | * | 5/2005 | Jarman | F03G 6/00 60/641.8 |
| 2003/0033806 A1 | * | 2/2003 | Bittner | F01K 25/02 60/675 |
| 2011/0041499 A1 | * | 2/2011 | Godwin | F03G 7/06 60/639 |
| 2014/0150419 A1 | * | 6/2014 | Godwin | F03G 7/04 60/531 |

* cited by examiner

*Primary Examiner* — Audrey K Bradley
(74) *Attorney, Agent, or Firm* — Lott & Fischer, PL

(57) ABSTRACT

A renewable energy device includes a wheel rotatably mounted on a base to spin about an axis of rotation and having a plurality of hollow, barbell-shaped fluid subassemblies fixed symmetrically about the axis. The fluid subassemblies each have a longitudinal axis radiating away from the axis of rotation, a hollow outer end defining a circular, ring-shaped, outer travel path when rotated about the axis of rotation, a hollow inner end defining a circular, ring-shaped, travel path disposed within the outer travel path when rotated about the axis of rotation, a hollow conduit fluidically connecting the outer and inner ends to define an interior cavity, and a room-temperature-boiling-point fluid disposed in the interior cavity. Inner and outer thermal variance subassemblies cover approximately half of respective ones of the inner and outer travel paths on at least one side of the wheel.

3 Claims, 3 Drawing Sheets

RENEWABLE ENERGY SYSTEM AND METHODS FOR CREATING RENEWABLE ENERGY

CROSS-REFERENCE TO RELATED APPLICATIONS

This application claims the priority, under 35 U.S.C. § 119, of U.S. Provisional Patent Application No. 62/155,199 filed Apr. 30, 2015, the prior application is herewith incorporated by reference herein in its entirety.

STATEMENT REGARDING FEDERALLY SPONSORED RESEARCH OR DEVELOPMENT

Not Applicable

FIELD OF THE INVENTION

The present systems and methods lies in the field of renewable energy generators. The present disclosure relates to a device that uses environmental energy sources such as gravity and heat to create a thermal gradient that causes sequenced fluid shifts within a rotatable system to create a state of constant imbalance so that the system is never able to achieve its lowest energy state. This imbalanced state induces rotational motion in the system, which rotation is maintained indefinitely as long as the thermal gradient is able to be maintained.

BACKGROUND OF THE INVENTION

As fossil fuels have become the epicenter of focus with regard to their deleterious effects on the environment, alternative, sustainable energy sources are avidly being sought. One of these sources is wind, but existing devices that can harness this energy source are expensive to build, install, and maintain; not to mention their threat to avian species. Further, wind-harnessing devices require an environment that provides adequate wind volume and speed. Another source of renewable energy is the sun. Solar panels convert light energy from the sun to electrical energy, but require very large surface areas, are fragile, are expensive, are labor-intensive to install, and require an environment that provides copious sunlight. Thus, a need exists to overcome the problems with the prior art systems, designs, and processes as discussed above.

SUMMARY OF THE INVENTION

The systems and methods described provide devices that utilize thermal gradients that overcome the herein aforementioned disadvantages of the heretofore-known devices and methods of this general type and that provide a self-contained system that can be used in almost any environment, including those with little sun and/or wind. The system can be easily modified to work in virtually any environment where a thermal gradient can be created.

The present systems and methods utilize the properties of liquids (e.g., alcohols, organic liquids) that vigorously evaporate or boil at temperatures that approximate the environment in which the device is to be utilized (for example, in temperate climates, pentane may be used as it has a boiling point of 36 degrees Celsius) that can be contained within one or more containment vessels. Each containment vessel, or heat exchanger, has a high temperature side and a low temperature side with a communication in between that allows the fluid to translate from one side to another. The high temperature side is where the boiling or evaporating of the liquid occurs and the low temperature side is the condensation side. For example, barbell-shaped heat exchangers disposed on a wheel and utilized to selectively boil and condense and, thereby, create a constant imbalance of the wheel. As long as the wheel is imbalanced, the system tries to achieve the lowest energy state possible by turning until the mass distribution on either side of the wheel is equal, the "sides" being relative to the vector of gravitational pull. If the system can remain in a constant imbalanced state, then the wheel will continue to rotate. The systems and methods herein exploit temperature gradients that are inherent to a particular environment to create gradients where none exist naturally. In one exemplary embodiment, a wheel with equally, radially dispersed fluid vials is mounted to an axle that rests on a stand/base. If the entire system is at uniform temperature, then the mass distribution on either side will be equal and the wheel will be static. The embodiment creates a situation where either side of the wheel constantly has a different mass distribution and, thus, the wheel turns. This imbalance is achieved by selectively allowing sunlight to shine on particular areas of the fluid vials on one side of the vial and on other particular areas of the vials on the opposite side of the vial. The sun-exposed areas have a higher temperature than the areas that are shaded. An analysis of an anticipated, predicted, or known temperature range in a given environment determines what fluid is to be used to fill the vials. The fluid is selected to have a boiling point substantially at the median of the anticipated temperature range for that environment so that the sun-exposed areas of the vials will reach the boiling point of the contained liquid and the "shaded" areas will be at a temperature below its boiling point, thereby, causing condensation of the liquid. The boiling and condensing properties are prearranged by one or more series of devices mated to the system. These devices include sun blocking elements (shading devices or shrouds) and/or thermal enhancing features, such as concentrating lenses or parabolic reflectors disposed to shift the fluid towards the outside of the perimeter on one side of the wheel and towards the inside perimeter of the wheel on the opposite side. In essence, each fluid vial has one boiling end and one condensing end at all times. The ends of each vial switch their function (from boiling to condensing or vice versa) once the vial transitions from one side of the wheel to the other. This keeps the wheel constantly imbalanced and, therefore, turning, to confer an ability of the system to perform work such as turning a generator.

With the foregoing and other objects in view, there is provided, a method and device that utilizes a mechanical apparatus mounted to a fixed frame at a pivot point so that the mechanical apparatus rotates or rocks when a thermal gradient is applied to at least one designated containment vessel containing a fluid that changes phase when a thermal gradient is applied to at least one portion of the vessel. The fluid has a liquid-to-gas phase-change property that occurs within the thermal gradient range applied to the vessel(s) within the mechanical apparatus so that, upon the fluid reaching its boiling point, the fluid is caused to shift during the expansion and/or boiling and condense in a secondary location within the vessel, thereby causing the apparatus to change from a zero-energy state to one of imbalance, which imparts rotational or rocking motion to the apparatus. Rotation or rocking will cause the location of the portion(s) of the vessels to index with areas within the system that have zones of temperatures strategically dispersed so that the fluid is constantly shifting towards the side of the apparatus that is substantially perpendicular to gravitational pull.

With the objects in view, there is also provided a renewable energy device including a base and a wheel rotatably mounted on the base to spin about an axis of rotation. The wheel comprises a plurality of hollow, barbell-shaped fluid subassemblies fixed thereto symmetrically about the axis of rotation. The fluid subassemblies each have a longitudinal axis radiating away from the axis of rotation, a hollow outer end defining a circular, ring-shaped, outer travel path when rotated about the axis of rotation, a hollow inner end defining a circular, ring-shaped, travel path disposed within the outer travel path when rotated about the axis of rotation, a hollow conduit fluidically connecting the outer and inner ends to define an interior cavity, and a room-temperature-boiling-point fluid disposed in the interior cavity. An outer thermal variance subassembly covers approximately half of the outer travel path on at least one side of the wheel. An inner thermal variance subassembly covers approximately half of the inner travel path on at least the one side of the wheel.

In accordance with another feature, the fluid subassemblies are disposed such that, upon the fluid reaching its boiling point in one of the inner and outer ends, boiling of the fluid causes shifting of the fluid into the other one of the inner and outer ends to, thereby, cause the wheel to change from a zero-energy state to one of imbalance that imparts rotational motion to the wheel.

In accordance with a further feature, rotation of the wheel causes a location of at least the inner and outer ends to index with areas covered respectively by the inner and outer thermal variance subassemblies to define zones of temperatures and cause the fluid to constantly shift towards a side of the wheel that is substantially perpendicular to gravitational pull.

Although the systems and methods are illustrated and described herein as embodied in a self-contained, renewable energy generator and methods for its manufacture and use, it is, nevertheless, not intended to be limited to the details shown because various modifications and structural changes may be made therein without departing from the spirit of the invention and within the scope and range of equivalents of the claims. Additionally, well-known elements of exemplary embodiments will not be described in detail or will be omitted so as not to obscure the relevant details of the systems and methods.

Additional advantages and other features characteristic of the systems and methods will be set forth in the detailed description that follows and may be apparent from the detailed description or may be learned by practice of exemplary embodiments. Still other advantages of the systems and methods may be realized by any of the instrumentalities, methods, or combinations particularly pointed out in the claims.

Other features that are considered as characteristic for the systems and methods are set forth in the appended claims. As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one of ordinary skill in the art to variously employ the systems and methods in virtually any appropriately detailed structure. Further, the terms and phrases used herein are not intended to be limiting; but rather, to provide an understandable description of the systems and methods. While the specification concludes with claims defining the systems and methods of the invention that are regarded as novel, it is believed that the systems and methods will be better understood from a consideration of the following description in conjunction with the drawing figures, in which like reference numerals are carried forward.

BRIEF DESCRIPTION OF THE DRAWINGS

The accompanying figures, where like reference numerals refer to identical or functionally similar elements throughout the separate views, which are not true to scale, and which, together with the detailed description below, are incorporated in and form part of the specification, serve to illustrate further various embodiments and to explain various principles and advantages all in accordance with the systems and methods. Advantages of embodiments of the systems and methods will be apparent from the following detailed description of the exemplary embodiments thereof, which description should be considered in conjunction with the accompanying drawings in which.

DETAILED DESCRIPTION OF THE EMBODIMENTS

Figure 1:
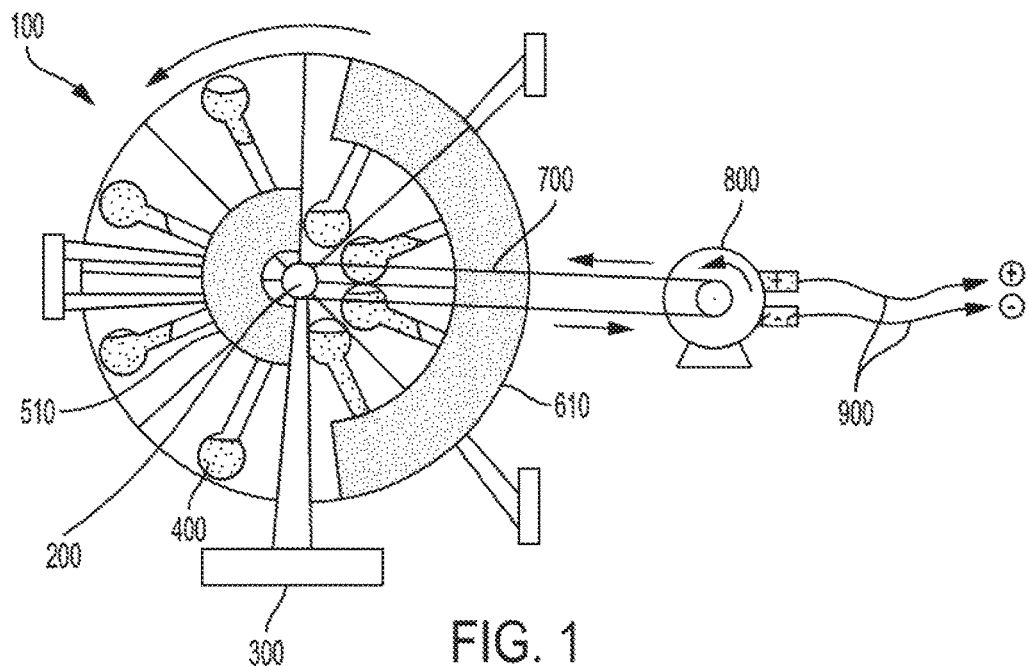
FIG. 1 is a diagrammatic side elevational view of an exemplary embodiment of a renewable energy system.

As required, detailed embodiments of the systems and methods are disclosed herein; however, it is to be understood that the disclosed embodiments are merely exemplary of the systems and methods, which can be embodied in various forms. Therefore, specific structural and functional details disclosed herein are not to be interpreted as limiting, but merely as a basis for the claims and as a representative basis for teaching one skilled in the art to variously employ the systems and methods in virtually any appropriately detailed structure. Further, the terms and phrases used herein are not intended to be limiting; but rather, to provide an understandable description of the systems and methods. While the specification concludes with claims defining the features of the systems and methods that are regarded as novel, it is believed that the systems and methods will be better understood from a consideration of the following description in conjunction with the drawing figures, in which like reference numerals are carried forward.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Alternate embodiments may be devised without departing from the spirit or the scope of the invention. Additionally, well-known elements of exemplary embodiments of the systems and methods will not be described in detail or will be omitted so as not to obscure the relevant details of the systems and methods.

Before the systems and methods are disclosed and described, it is to be understood that the terminology used herein is for the purpose of describing particular embodiments only and is not intended to be limiting. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element. The terms "including" and/or "having," as used herein, are defined as comprising (i.e., open language). The terms "a" or "an", as used herein, are defined as one or more than one. The term "plurality," as used herein, is defined as two or more than two. The term "another," as used herein, is defined as at least a second or more. The description may use the terms "embodiment" or "embodiments," which may each refer to one or more of the same or different embodiments.

The terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact (e.g., directly coupled). However, "coupled" may also mean that two or more elements are not in direct contact with each other, but yet still cooperate or interact with each other (e.g., indirectly coupled).

For the purposes of the description, a phrase in the form "A/B" or in the form "A and/or B" or in the form "at least one of A and B" means (A), (B), or (A and B), where A and B are variables indicating a particular object or attribute. When used, this phrase is intended to and is hereby defined as a choice of A or B or both A and B, which is similar to the phrase "and/or". Where more than two variables are present in such a phrase, this phrase is hereby defined as including only one of the variables, any one of the variables, any combination of any of the variables, and all of the variables, for example, a phrase in the form "at least one of A, B, and C" means (A), (B), (C), (A and B), (A and C), (B and C), or (A, B and C).

Relational terms such as first and second, top and bottom, and the like may be used solely to distinguish one entity or action from another entity or action without necessarily requiring or implying any actual such relationship or order between such entities or actions. The description may use perspective-based descriptions such as up/down, back/front, and top/bottom. Such descriptions are merely used to facilitate the discussion and are not intended to restrict the application of disclosed embodiments. Various operations may be described as multiple discrete operations in turn, in a manner that may be helpful in understanding embodiments; however, the order of description should not be construed to imply that these operations are order dependent.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the systems and methods are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring now to the figures of the drawings in detail and first, particularly to FIGS. 1 and 2, there is shown a first exemplary embodiment of a self-contained, renewable energy generator. A generator wheel 100 has an axle 200 that is rotatably connected to a stand 300 in a substantially frictionless manner. For example, the axle 200 can be connected to the stand 300 with a sliding, frictionless, tapered roller bearing, or a greaseless spherical-ball bearing. Materials of the bearing can include ceramic, sapphire, glass, steel, bronze, other metals, and plastic (e.g., nylon, polyoxymethylene, polytetrafluoroethylene, and thermoplastic polyethylene such as ultra-high-molecular-weight polyethylene (UHMWPE, UHMW), high-modulus polyethylene (HMPE), and high-performance polyethylene (HPPE)).

Figure 2:
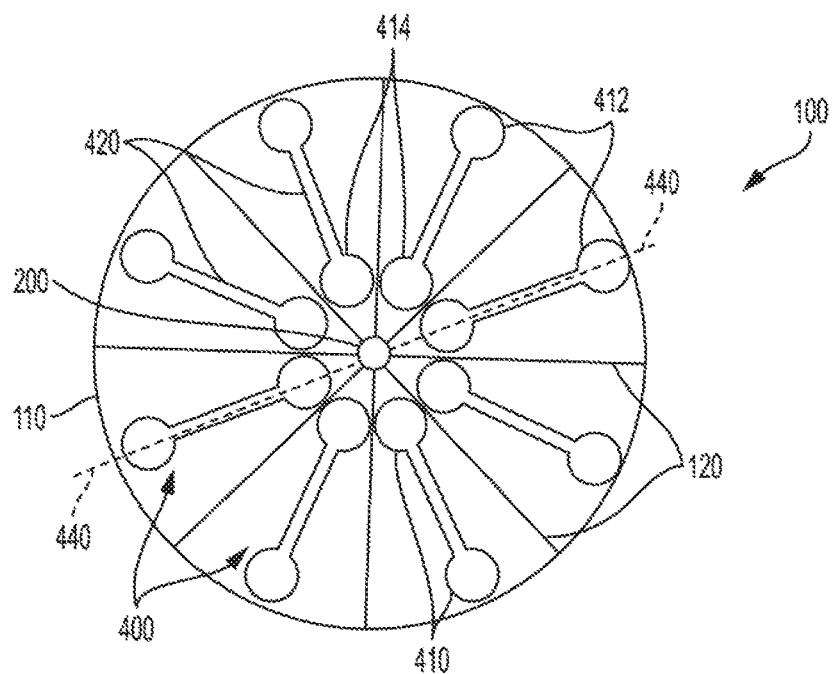
FIG. 2 is a diagrammatic, side elevational view of a rotating wheel of FIG. 1 with the boiling/condensing fluid removed.

One exemplary embodiment of the generator wheel 100 is illustrated separately in FIG. 2. The wheel 100 has an outer rim 110 connected to the axle 200 with spokes 120. In each segment 130 of the wheel 100, which is defined by the spokes 120, rests a boiling and condensing sub-assembly 400 (referred to herein as a "B&C subassembly"). The spokes 120 and the B&C subassemblies 400 are configured on the wheel 100 to be circumferentially symmetrical so that, when the wheel 100 is spun on the stand 300 about the axle 200, the wheel 100 spins without wobble in any of the roll, pitch, and yaw directions.

The B&C subassembly 400 has a symmetrical barbell-type shape with identical opposing ends 410. These ends 410 can be spherical, as shown, or can take any other shape, such as a cone, a pyramid, a cylinder, hedrons having 4 or more symmetrical sides (e.g., pentagonal trapezohedron, dodecahedron, icosahedron, deltoidal icositetrahedron, and rhombic triacontahedron), and an elongated hexagonal bipyramid, to name a few. The ends 410 are hollow and are fluidically connected to one another through hollow central tube 420. Disposed within the hollow cavities of the B&C subassembly 400 is a fluid 430 that will be described in further detail with regard to FIGS. 3 to 7. Each of the B&C subassemblies 400 defines a central longitudinal axis 440 that passes directly through the central axis 130 of the wheel 100. Each of the B&C subassemblies 400 is also, in the exemplary embodiment, symmetrical about the respective central longitudinal axis 440, although this is not a requirement. In such an orientation, the B&C subassemblies 400 each define an outer end 412 and an inner end 414.

Figure 3:
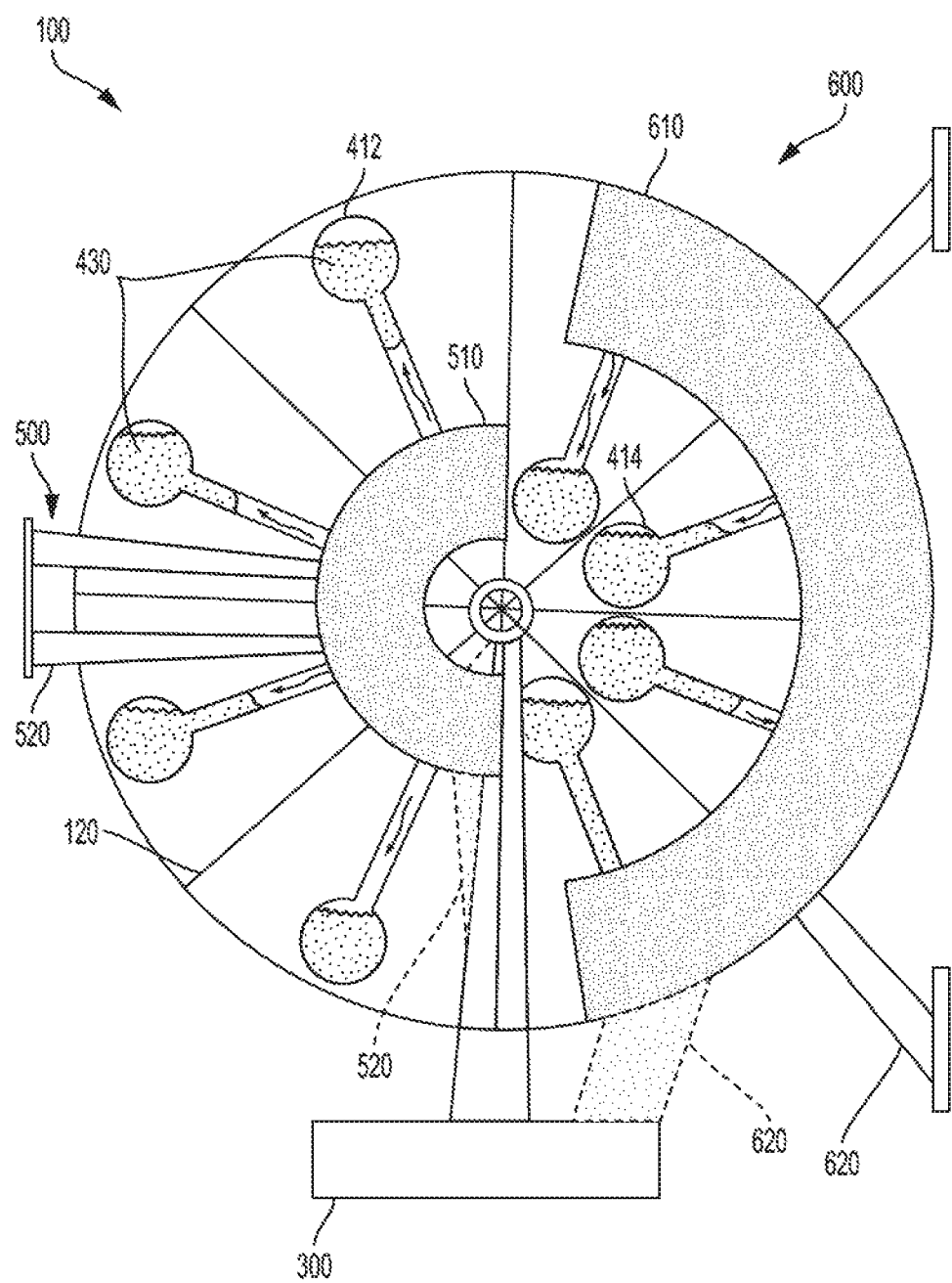
FIG. 3 is an enlarged, diagrammatic, side elevational view of the boiling/condensing apparatus of FIG. 1.

Associated with the wheel 100 are thermal variance sub-assemblies 500 and 600, which are best seen in FIG. 3. The inner thermal variance sub-assembly 500 is associated with a respective set of the inner ends 414 and the outer thermal variance sub-assembly 600 is associated with a respective set of the outer ends 412. In the exemplary embodiment shown in FIG. 3, the inner thermal variance sub-assembly 500 has a shield 510 associated with four of the inner ends 414 on a first semi-circular half of the wheel 100 and the outer thermal variance sub-assembly 600 has a shield 610 associated with four of the outer ends 412 on a second semi-circular half of the wheel 100 opposite the first half. In this orientation, therefore, the two shields 510, 610 have inner circular arc segments facing one another. Each of the shields 510, 610 have grounding devices 520, 620, respectively, that fix the shields 510, 610 in position relative to the wheel 100, which is able to spin on the axle 200. The grounding devices 520, 620 are depicted, in this exemplary embodiment as buttresses that can be fixed to the environment although they can equally be fixed directly to the stand 300 if desired. In such a latter configuration (shown with dashed lines and filled with dots in FIG. 3), the entire device can be moved about as a single unit. The shields 510, 610 can be flat plates existing on only one side of the wheel 100 or they can be on both sides of the wheel 100. In the latter configuration, when either side of the wheel 100 is directed to face a heat source (such as the sun), radiation from that heat source will not impact the respectively covered inner ends 414 or outer ends 412 and, instead, will be absorbed by the shields 510, 610. As such, energy will be imparted only to the inner and outer ends 414, 412 that are outside the protective enclosure of the shields 510, 610, such as the left four outer ends 412 and the right four inner ends 414 shown in FIG. 3. Thus, in the example of FIG. 3, as long as the left four outer ends 412 and the right four inner ends 414 remain unshielded, only those eight ends will be heated by radiation from the sun. In an alternative, opposite configuration, the shields 510, 610 can be of a material that absorbs radiation from the sun and heat up when so exposed or they can be shaped, for example, as reflectors that concentrate radiation that is imparted onto the shields 510, 610. As reflectors, they can be structures having a mirrored, concave inner surface facing the respective inner and outer ends 414, 412 and, thereby, direct a much larger amount of radiation from the sun into the volume of those ends. In either configuration, the shields 510, 610 act to either cool or heat one half of respective ends 412, 414 but not the other half to create a temperature gradient in each set of the inner ends 414 and the outer ends 412.

It is noted that the inner shield 510 covers approximately 180 degrees of the circular wheel 100 and that outer shield 610 covers less than 180 degrees of the circular wheel 100 (e.g., approximately 160 degrees). These configurations are merely exemplary and can extend from approximately 150 arc degrees to approximately 210 arc degrees.

Figure 4:
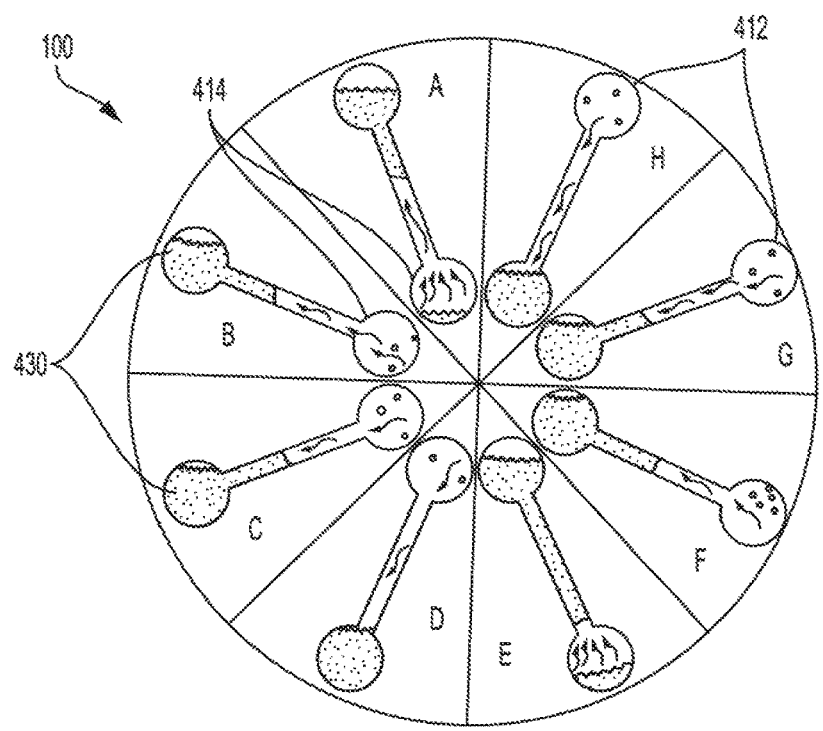
FIG. 4 is a diagrammatic, side elevational view of an exemplary embodiment of the rotating wheel of FIG. 1 with the boiling/condensing fluid in various stages of boiling and condensing.
Figure 5:
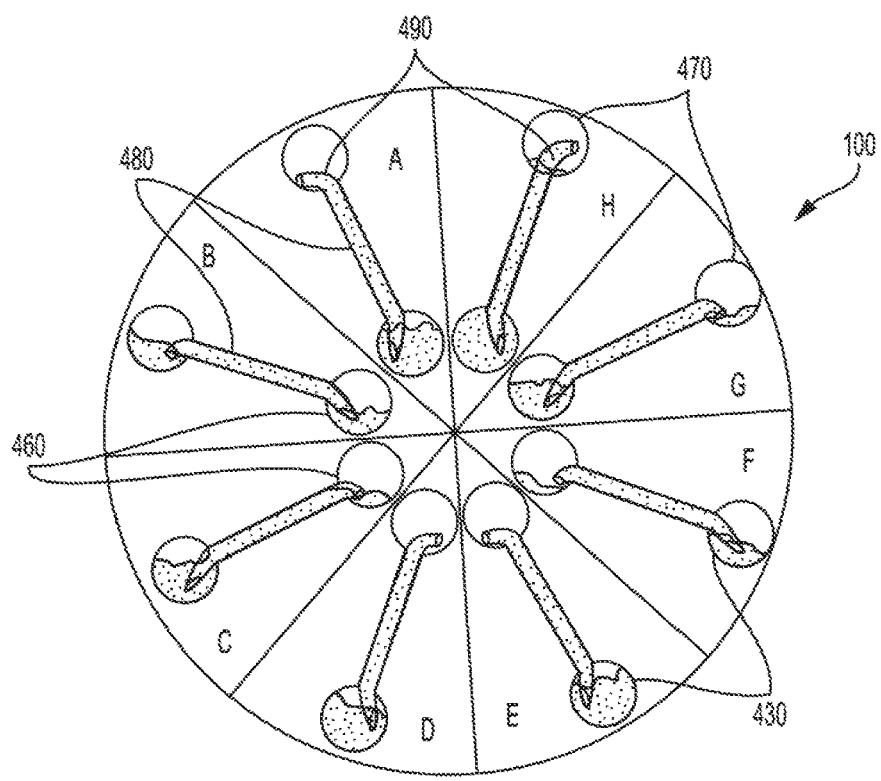
FIG. 5 is a diagrammatic, side elevational view of another exemplary embodiment of the rotating wheel of FIG. 1 with the boiling/condensing fluid in various stages of boiling, flowing, and condensing.

The configurations of FIGS. 4 and 5 illustrate how the temperature gradient is imparted to the respective sets of inner and outer ends 414, 412. The configuration of FIG. 4 is first described with regard to B&C subassembly 400. Each of the B&C subassemblies 400 is filled with the fluid 430 that is able to boil at temperatures of the environment in which the system is to be used and is sealed off from the environment. If light is being used to heat the fluid 430, then the B&C subassemblies 400 can be make of a material that allows light to pass therein, such as clear glass. Other substances are equally possible. The seal can be manufactured, such as an open-less glass enclosure, or a valve can be installed (e.g., symmetrical along the longitudinal axis 440 for balancing purposes) to pressurize or impart a vacuum therein as desired and described in further detail below. With each of the B&C subassemblies 400 so sealed and installed on the wheel 100 as shown in FIGS. 1 and 3, the temperature gradient can now be explained with regard to FIG. 4. In the example configuration of FIG. 4, the shields 510, 610 are present as in FIGS. 1 and 3 but are not illustrated. Also in this configuration, the shields 510, 610 are configured to impart heat onto the B&C subassemblies 400. As such, if the light source (e.g., the sun) is on the far side of the system in FIG. 4, the shields 510, 610 on the side facing the viewer of FIG. 4 are concave, reflecting mirrors that direct light into the B&C subassemblies 400 as they pass past and, if desired, opposing, non-illustrated shields 510, 610 on the opposite side of the wheel 100 are light-passing magnifiers, such as an assembly of magnifying lenses in the shape of the shield arc. In this way, all light passing from the sun into the ends 412, 414 of the B&C subassemblies 400 is magnified and intensified and, all light passing entirely through the ends 412, 414 is then reflected back again into the ends 412, 414.

In FIG. 4, the wheel 100 will spin counter-clockwise with heat-imparting shields 510, 610. The explanation will starting from the 12-o'clock position of the wheel 100 and move counterclockwise, each of the pie-shaped sections being described with a different letter. In this embodiment, the inner ends 414 on the left half of the wheel 100 will be heated. Just before heat is imparted into the inner end 414 entering section A, all of the fluid 430 rests within the inner end 414. As inner end 414 enters section A, the fluid 430 starts boiling and the resulting gas enters the outer end 414 of section A, where the gas condenses and collects due to the fact that the outer end 414 is receiving much less heat from the sun than the inner end 414 (it is noted that the C-shaped arc section spanning the path of the outer end 412 can be covered and/or insulated so that the outer end 412 is cooled or kept cool as it passes from section A to D. As inner end 414 rotates counterclockwise and enters section B, the fluid 430 is almost all boiled, the gas within the outer end 414 of section A being entirely condensed. Gravity acting on the condensed fluid 430 in the outer end 414 pulls that outer end 414 downwards. As inner end 414 rotates further counterclockwise and enters section C, almost all of the fluid 430 has boiled inside inner end 414 and the fluid 430 exists as a fluid only in the outer end 412, still providing weight to propel the outer end 412 around the axle 200. As inner end 414 goes through section D, all of the fluid 430 resides in the outer end 412, at which time, the relatively cooler outer end 412 enters shield 610 to begin receiving heat. Outer end 412 within section E is immediately heated to start boiling the fluid 430. Inner end 414 within section E now resides within the relatively cooler location of the B&C subassembly 400 and, thereby, provides the condensation chamber. As in the other semicircular half, the path that the inner end 414 takes through the right half can be left to receive mere sunlight without any focus or reflection or it can be entirely shrouded and/or insulated to provide a much cooler travel path for the inner end 414. When entering section F, the fluid 430 in the outer end 412 is mostly boiled out and the gas produced is now mostly condensed within the inner end 414. This weight is now at a radial distance much closer to the axle 200 than the volume of condensed fluid 430 in sections B, C, and D. Accordingly, weight of the fluid 430 in the inner end 414 in section F has a relatively lesser effect on rotation of the wheel 100 about the axle 200. Likewise, in section G, the fluid is mostly boiled off from the outer end 412 and condensed in the inner end 414. Finally, within section H, there is no fluid within the outer end 412 and all of the fluid resides in the inner end 414. As the B&C subassembly 400 moves from section H to section A, the process starts over to heat the inner end 414 and cool the outer end 412.

If the system is left in this state of exposure to sunlight, the wheel 100 will continue spinning counterclockwise until the exposure ends. With reference back to FIG. 1, if the axle 200 is connected to a belt 700 or other rotation-imparting device, that belt 700 can be connected to a generator 800 that, when turned by the wheel 100, will generate electricity at electrodes 900.

FIG. 5 illustrates an alternative embodiment of a B&C subassembly 450. This B&C subassembly 450 has hollow inner and outer ends 460, 470 fluidically connected to one another through hollow central tube 480. What is different from the B&C subassembly 400 above is the addition of a hollow intermediate flow conduit 490 disposed inside and throughout the central tube 480 but also extending into the hollow centers of both the inner and outer ends 460, 470 to a distance sufficient to perform two functions. First, the distal ends of the flow conduit 490 need to be sufficiently flexible to bend due to the force of gravity and, second, the distal ends need to be long enough to bend in a way that keeps the distal opening of the flow conduit 490 submerged in the fluid 430 for as long as possible before it all boils away into the opposing end of the B&C subassembly 450. These functions are described similarly to FIG. 4 by defining each of the pie-shaped segments with individual letters A through H.

In FIG. 5, the wheel 100 will spin counter-clockwise with heat-imparting shields 510, 610. As above, the explanation starts from the 12-o'clock position of the wheel 100 and moves counterclockwise. In this embodiment, the inner ends 460 on the left half of the wheel 100 will be heated. Just before heat is imparted into the inner end 460 entering section A, all of the fluid 430 resides in the inner end 460 and the inner distal end of the flow conduit 490 is submersed in the fluid 430 within the inner end 460. As inner end 460 enters section A, the fluid 430 starts boiling and the resulting pressure caused by the boiling forces the fluid 430 through the flow conduit 490 outwards into the outer end 470, any gas that passes through the flow conduit 490 condensing and collecting due to the fact that the outer end 470 is receiving much less heat than the inner end 460. As above, the C-shaped arc section spanning the path of the outer end 470 can be covered and/or insulated so that the outer end 470 is cooled or kept cool as it passes from section A to D. As inner end 460 rotates counterclockwise and enters section B, the fluid 430 continues to be forced into the outer end 470 and all gas within the outer end 460 condensing there. Gravity acting on the fluid 430 in the outer end 470 pulls that outer end 470 downwards. As inner end 460 rotates further counterclockwise and enters section C, almost all of the fluid 430 has been forced into the outer end 470, that fluid providing weight to propel the outer end 470 around the axle 200. As inner end 460 goes through section D, all of the fluid 430 has transferred into the outer end 470 by either being forced fluidically through the flow conduit 490 or by boiling, at which time, the relatively cooler outer end 470 enters shield 610 to begin receiving heat from the opposing half of the wheel 100. As can be seen in FIG. 5, because the ends of the flow conduit 490 are floppy, they remain as long as possible within the fluid 430. More specifically, the inner end is immersed in the fluid 430 within the inner end 460 through sections A, B, and C and only exits the fluid 430 after almost all has transferred to the outer end 470 in section D Likewise, the outer end is not immersed in the fluid 430 within the inner end 460 in section A but is immersed within the fluid 430 throughout sections B, C, and D. The two distal ends of the flow conduit 490 can be weighted in a known manner to aid in submersion.

When moved into the right half of the wheel 100, the fluid 430 within the outer end 470 of section E is immediately heated to start boiling the fluid 430 and forcing the fluid 430 through the flow conduit 490 into the inner end 460. The inner end 460 within section E now resides within the relatively cooler location of the B&C subassembly 450 and, thereby, provides the condensation and fluid-receiving chamber, the inner end of the flow conduit 490 not being submersed yet in fluid 430. As in the other semicircular half, the path that the inner end 460 takes through the right half can be left to receive mere sunlight without any focus or reflection or it can be entirely shrouded and/or insulated to provide a much cooler travel path for the inner end 460. When entering section F, the fluid 430 in the outer end 470 is mostly boiled and is forced out into the inner end 460, any gas within the inner end 460 being condensed there. The fluid 430 is now at a radial distance much closer to the axle 200 than the volume of condensed fluid 430 in sections B, C, and D. Accordingly, weight of the fluid 430 in the inner end 460 in sections G and H has a relatively lesser effect on rotation of the wheel 100 about the axle 200. Likewise, in section G, the fluid is mostly boiled off from the outer end 470 and forced into and/or condensed within the inner end 460. Finally, within section H, there is no fluid within the outer end 470 and all of the fluid resides in the inner end 460. As the B&C subassembly 450 moves from section H to section A, the process starts over to heat the inner end 460 and cool the outer end 470. As in the other left half, the distal ends of the flow conduit 490 behave similarly. More specifically, the inner end is immersed in the fluid 430 within the inner end 460 through sections F, G, and H and is only outside the fluid 430 in section E Likewise, the outer end of the flow conduit 490 is not immersed in the fluid 430 within the inner end 460 in section H but is immersed within the fluid 430 throughout sections E, F, and G.

If the system is left in this state of exposure to sunlight, the wheel 100 will continue spinning counterclockwise until the exposure ends. With reference back to FIG. 1, if the axle 200 is connected to a belt 700 or other rotation-imparting device, that belt 700 can be connected to a generator 800 that, when turned by the wheel 100, will generate electricity at electrodes 900.

The fluid 430 can be a variety of different liquids. For example, the fluid 430 can be methane (which has a boiling point of −164° C.), ethane (which has a boiling point of −89° C.), propane (which has a boiling point of −42° C.), butane (which has a boiling point of −0.05° C.), pentane (which has a boiling point of 36° C.), hexane (which has a boiling point of 69° C.), methanol (which has a boiling point of 65° C.), ethanol (which has a boiling point of 79° C.), and/or 1-propanol (which has a boiling point of 97° C.). These fluids each have their own distinct boiling points and this characteristic is important for transportability. Because the systems and methods described herein can be used in any location, that location will have different temperature conditions. For example, higher latitudes will experience lower average temperatures and lower latitudes will experience higher average temperatures. Whatever the predicted temperature difference is anticipated to be in any given environment will determine what fluid 430 is to be used to fill the B&C subassemblies 400, 450. If the fluid 430 has a boiling point that is outside the temperature range of the location in which the system will be used, then the fluid 430 will not boil and the system will not work. Accordingly, the fluid 430 can be selected to have a boiling and evaporation point tailored to the location. The fluid is chosen by selecting a liquid that has a boiling or evaporation point substantially at the median of the anticipated temperature for the given environment so that the sun-exposed areas of the vials will reach the boiling point of the contained liquid and the "shaded" areas will be at a temperature below its boiling point causing condensation of the liquid.

In some instances, different fluids 430 may not be available. In such a case, the B&C subassembly 400, 450 can be provided with a valve that can regulate the internal pressure of the B&C subassembly 400, 450. With application of the Ideal Gas Law (PV=nRT), the increasing the pressure in the B&C subassembly 400, 450 will raise the temperature in which the fluid 430 will boil (good for warmer climates) and decreasing the pressure in the B&C subassembly 400, 450 will lower the temperature in which the fluid 430 will boil (good for colder climates). The pressure can be, for example, changes with an external vacuum generator or an external compressed gas cartridge.

In other embodiments, the boiler-condenser assembly may be used to create a reciprocating motion. This embodiment would include a fulcrum with an assembly containing at least one boiler-condenser that cants to the side with the greater mass. The only mass that is not equally distributed across the fulcrum is the fluid contained within the boiler-condenser assembly. The boiler is on one side of the fulcrum and the condenser portion resides on the other side, with a communication conduit between the two allowing for translation of the fluid from one side of the fulcrum to the other when the proper thermal gradient is created. The condenser or cool side is the location that the fluid, and thus the mass, disproportionately translates. The boiler or evaporator side is the location from which the fluid moves away. Therefore, the condenser side ultimately will contain the greatest mass and would cause the system to submit to disproportionate gravitational pull and tip the assembly downward towards gravity on that side. Once that end is in the downward or "low" position, it is within an environment where there resides a thermal collector (e.g., a shroud containing light-concentrating lenses directed at that fluid reservoir), turning the condenser side of the vessel into the boiling-evaporating side. The extreme other end of the assembly will have its fluid reservoir portion of the assembly in a thermal environment that is opposite the contralateral reservoir. For example, each end of the vessel on either side of the fulcrum is always in a thermal environment that is always opposite of the other. The described systems and methods create a constantly imbalanced system, with resultant motion that is either rotational or reciprocating. As long as the wheel or reciprocating assembly is imbalanced, the device tries to achieve the lowest energy state possible by turning or "tipping" to one side until the mass distribution on either side of the wheel or fulcrum is equal. Because the system can remain in a constant imbalanced state, the wheel, or linear assembly in the case of a reciprocating system, continues to move.

It is noted that various individual features of the inventive processes and systems may be described only in one exemplary embodiment herein. The particular choice for description herein with regard to a single exemplary embodiment is not to be taken as a limitation that the particular feature is only applicable to the embodiment in which it is described. All features described herein are equally applicable to, additive, or interchangeable with any or all of the other exemplary embodiments described herein and in any combination or grouping or arrangement. In particular, use of a single reference numeral herein to illustrate, define, or describe a particular feature does not mean that the feature cannot be associated or equated to another feature in another drawing figure or description. Further, where two or more reference numerals are used in the figures or in the drawings, this should not be construed as being limited to only those embodiments or features, they are equally applicable to similar features or not a reference numeral is used or another reference numeral is omitted.

The foregoing description and accompanying drawings illustrate the principles, exemplary embodiments, and modes of operation of the systems and methods. However, the systems and methods should not be construed as being limited to the particular embodiments discussed above. Additional variations of the embodiments discussed above will be appreciated by those skilled in the art and the above-described embodiments should be regarded as illustrative rather than restrictive. Accordingly, it should be appreciated that variations to those embodiments can be made by those skilled in the art without departing from the scope of the systems and methods as defined by the following claims.

What is claimed is:

1. A renewable energy device, comprising:
a base;
a wheel rotatably mounted on the base to spin about an axis of rotation and comprising a plurality of hollow, barbell-shaped fluid subassemblies fixed to the wheel symmetrically about the axis of rotation, the fluid subassemblies each having:
a longitudinal axis radiating away from the axis of rotation;
a hollow outer end defining a circular, ring-shaped, outer travel path when rotated about the axis of rotation;
a hollow inner end defining a circular, ring-shaped, inner travel path disposed within the outer travel path when rotated about the axis of rotation;
a hollow conduit fluidically connecting the outer and inner ends to define an interior cavity; and
a room-temperature-boiling-point fluid disposed in the interior cavity;
an outer shield covering approximately half of the outer travel path on at least one side of the wheel; and
an inner shield covering approximately half of the inner travel path on at least the one side of the wheel.

2. The device according to claim 1, wherein the fluid subassemblies are disposed such that, upon the fluid reaching its boiling point in one of the inner and outer ends, boiling of the fluid causes shifting of the fluid into the other one of the inner and outer ends to, thereby, cause the wheel to change from a zero-energy state to one of imbalance that imparts rotational motion to the wheel.

3. The device according to claim 1, wherein rotation of the wheel causes a location of at least the inner and outer ends to index with areas covered respectively by the inner and outer shields to define zones of temperatures and cause the fluid to constantly shift towards a side of the wheel that is substantially perpendicular to gravitational pull.

* * * * *